US008740069B2

(12) United States Patent
Choy (10) Patent No.: US 8,740,069 B2
(45) Date of Patent: Jun. 3, 2014

(54) FRAUD-FREE PAYMENT FOR INTERNET PURCHASES

(76) Inventor: Heng Kah Choy, Chaoyang District (CN)

( * ) Notice: Subject to any disclaimer, the term of this patent is extended or adjusted under 35 U.S.C. 154(b) by 1020 days.

(21) Appl. No.: 11/341,952

(22) Filed: Jan. 25, 2006

(65) Prior Publication Data

US 2006/0218091 A1 Sep. 28, 2006

Related U.S. Application Data

(60) Provisional application No. 60/647,315, filed on Jan. 26, 2005.

(51) Int. Cl.
| | | |
|---|---|---|
| *G06Q 40/00* | (2012.01) | |
| *G07D 11/00* | (2006.01) | |
| *G07F 19/00* | (2006.01) | |
| *G06K 5/00* | (2006.01) | |
| *G06F 7/08* | (2006.01) | |
| *G06K 19/00* | (2006.01) | |
| *G06Q 20/00* | (2012.01) | |

(52) U.S. Cl.
USPC ........... 235/383; 235/379; 235/380; 235/381; 235/382; 235/487; 705/17; 705/65; 705/72; 705/64

(58) Field of Classification Search
CPC .. G06A 20/028; G06A 20/28; G06A 20/0655
USPC ........ 235/380, 381, 379, 383; 705/75, 77–79, 705/64, 40, 65, 72, 17
See application file for complete search history.

(56) References Cited

U.S. PATENT DOCUMENTS

| | | | | |
|---|---|---|---|---|
| 4,717,815 A | * | 1/1988 | Tomer | 235/378 |
| 5,892,827 A | * | 4/1999 | Beach et al. | 705/76 |
| 6,014,636 A | * | 1/2000 | Reeder | 705/17 |
| 6,085,168 A | * | 7/2000 | Mori et al. | 705/17 |
| 6,341,273 B1 | * | 1/2002 | Briscoe | 705/41 |
| 6,467,684 B2 | | 10/2002 | Fite et al. | |

(Continued)

FOREIGN PATENT DOCUMENTS

| | | |
|---|---|---|
| CA | 2480447 | 9/2003 |
| EP | 1213689 A2 | 6/1999 |

(Continued)

OTHER PUBLICATIONS

Canadian Office Action Dated Mar. 28, 2013.

(Continued)

*Primary Examiner* — Daniel Walsh (57) ABSTRACT

A simple, non-intrusive, fraud free payment method for customers to make Internet purchases without using credit cards or revealing personal information. Customers can purchase any specific dollar amount of pay codes via on-line purchase by logging into their financial institution and purchasing the codes, via phone banking (using mobile phone or fixed telephone line) or via Automated Teller Machine (ATM). There is no need for the customer to first open an account with the payment service. The easy and fast set-up of a secure payment gateway for website merchants to receive payments for their goods purchased at their websites, eliminates the need of setting up a merchant account, chargeback and being penalized by banks for chargeback on sales. The amount due to the web merchant from the Internet transaction is credited directly into the merchant's bank account when the transaction and payment is approved by the customer's bank.

25 Claims, 4 Drawing Sheets

(56) References Cited

U.S. PATENT DOCUMENTS

| | | | |
|---|---|---|---|
| 6,908,030 B2* | 6/2005 | Rajasekaran et al. | 235/379 |
| 7,328,189 B2* | 2/2008 | Ling | 705/41 |
| 7,416,115 B2* | 8/2008 | Licciardello et al. | 235/380 |
| 7,428,637 B1* | 9/2008 | Billman et al. | 713/168 |
| 7,706,838 B2* | 4/2010 | Atsmon et al. | 455/558 |
| 2001/0013018 A1* | 8/2001 | Awano | 705/41 |
| 2001/0029485 A1* | 10/2001 | Brody et al. | 705/39 |
| 2001/0032878 A1* | 10/2001 | Tsiounis et al. | 235/379 |
| 2001/0034724 A1* | 10/2001 | Thieme | 705/78 |
| 2002/0004760 A1* | 1/2002 | Yoshida et al. | 705/26 |
| 2002/0046189 A1* | 4/2002 | Morita et al. | 705/67 |
| 2002/0128929 A1* | 9/2002 | Urabe | 705/26 |
| 2002/0138444 A1* | 9/2002 | Granfeldt et al. | 705/65 |
| 2002/0174062 A1* | 11/2002 | Sines et al. | 705/39 |
| 2002/0194119 A1* | 12/2002 | Wright et al. | 705/38 |
| 2003/0004828 A1 | 1/2003 | Epstein | |
| 2003/0018579 A1* | 1/2003 | Litster et al. | 705/40 |
| 2003/0080183 A1* | 5/2003 | Rajasekaran et al. | 235/379 |
| 2003/0097344 A1* | 5/2003 | Chaum et al. | 705/75 |
| 2003/0105672 A1* | 6/2003 | Epstein et al. | 705/26 |
| 2003/0163423 A1* | 8/2003 | Holst-Roness | 705/40 |
| 2003/0200179 A1* | 10/2003 | Kwan | 705/65 |
| 2004/0158532 A1* | 8/2004 | Breck et al. | 705/74 |
| 2004/0164145 A1* | 8/2004 | Licciardello et al. | 235/381 |
| 2004/0267673 A1* | 12/2004 | Ballard et al. | 705/77 |
| 2005/0080747 A1* | 4/2005 | Anderson et al. | 705/64 |
| 2006/0076400 A1* | 4/2006 | Fletcher | 235/379 |
| 2007/0276736 A1* | 11/2007 | Guilfoyle | 705/17 |
| 2009/0173782 A1* | 7/2009 | Muscato | 235/379 |
| 2013/0151418 A1* | 6/2013 | Licciardello et al. | 705/72 |

FOREIGN PATENT DOCUMENTS

| | | |
|---|---|---|
| JP | 2001-297356 | 10/2001 |
| WO | WO9927475 A1 | 6/1999 |
| WO | WO0167407 A1 | 9/2001 |

OTHER PUBLICATIONS

EPO Opinion.
EPO Office Action Jul. 25, 2011.
International Search Report and Written Opinion (References Previously Cited).
Australia Examination Report.

* cited by examiner

FRAUD-FREE PAYMENT FOR INTERNET PURCHASES

This application claims priority, under 35 U.S.C. §119(e), from U.S. provisional application Ser. No. 60/647,315 filed on Jan. 26, 2005; and the entire teachings of that application is hereby incorporated by reference, in its entirety.

BACKGROUND OF THE INVENTION

1. Field of the Invention

The present invention relates to e-commerce. More particularly, it relates to apparatus, a system and methods used for making fraud-free payment for on-line Internet purchases.

2. Background Art

Electronic commerce is a means of conducting commerce via electronic devices, which speeds up information delivery and coverage. It provides the opportunity to market products and services worldwide, crossing international boundaries and reaching a mass of people. With the Internet's vast potential to reach a mass of potential customers, and its effectiveness in disseminating information relating to products and services, people are trying to capitalize on this new platform by conducting businesses through appropriate Websites. The increasing popularity of the Internet is likely to boost electronic commerce transactions.

As soon as a web merchant develops an online sales presence, he or she has the capacity to sell 24 hours a day, 7 days a week, all around the world. Clients and customers can have up-to-the-minute information about a products, services, prices, and availability. Steps to take to ensure that customers can shop 24/7 include handling invoices, billing, processing payments, and remitting money.

Internet e-commerce is mostly transacted using credit cards. No physical paper needs to be passed, as is the case with cash or checks. We simply type our credit card number into the merchant's World Wide Web (WWW) page payment form and wait for our purchase to be shipped to us. The only thing that needs to pass between the merchant and the buyer is the credit card number. The main problem here is that, it is not as simple as it seems.

One of the principal factors impeding the growth of e-commerce is that of security. People have legitimate fears about giving their credit card number out over the Internet. The crux of the matter lies in the fact that electronic mail messages are normally sent unencrypted. That is to say, anyone who intercepts the electronic mail message could read its contents without difficulty. There has been an understandable reluctance by users to send their credit card details in an electronic mail message that could be read by any user. Credit card transactions processed via an insecure connection, i.e. via a site without proper risk-elimination facilities for credit card transactions is vulnerable to security risk. The Internet, being an open network with very basic security provisions, enables unauthorized parties to intercept credit card data submitted via the Internet. Because the transaction is processed without a signature, the identity of the cardholder cannot be authenticated. In addition, the merchant may not be authorized to accept credit card payments. Furthermore, credit card data are visible to the Internet merchant. An unscrupulous merchant could use the customer's credit card data to make purchases without the customer's knowledge.

The challenge e-commerce retailers face is providing a payment mechanism that consumers perceive as sufficiently secure and convenient to induce them to complete commercial transactions online. The Internet is an open network without any basic security provisions built in. Unless a secure server is involved, i.e. one that uses SSL or S-HTTP for transporting data, data passes between the browser and the server unencrypted. Many alternative ways have been proposed or are now in use for providing secure and convenient payment for Internet transactions, but none have come anywhere close to the acceptance that paper and coin-based currency have today. For electronic commerce to grow beyond a small niche market, ordinary consumers will have to be persuaded to accept some form of digital payment mechanism as being as reliable and convenient to use as cash is today. Unless the merchant is working on a strict cash basis (which is difficult on the web) or using some other method of offline payment, taking money is not easy and requires different processes of interaction with banks or other financial institutions.

The first attempt at making online credit card transactions secure was to take the transaction off-line. Many sites will allow you to call in your credit card number to a customer support person. This solves the problem of passing the credit card number over the Internet, but eliminates the merchant's ability to automate the purchasing process. The disadvantage is that an employee needs to be available 24 hours a day to take phone calls from buyers. Furthermore, the credit card numbers of the customers making purchases at the merchant's website is susceptible to theft by the company's employee to make fraudulent purchases, at least in part because the employee employed for this function in the company may be a low level company employee who is not paid a high salary. Also, many potential customers that visit the net only have one phone line. This means they need to log off the Internet in order to actually make a purchase. This further impedes the free-flow of e-commerce over the internet. In many instances, the customer who wants to make a purchase over the internet will be put off by this inconvenience of not being able to do a direct real-time online transaction over the internet.

The next method that was developed, which is currently used by many sites, is hosting the WWW site on a secure server. Credit card transactions between the merchant web site and the consumer are encrypted using a technology called SSL, or secure sockets layer. This prevents any intrepid cyber thug from stealing the customer's account number. SSL does not secure the applications or documents on the merchant site or server, but secures only the connection. One other shortcoming of SSL is that it cannot confirm for the merchant that the person with the credit number is actually the real cardholder. Similarly, there is no way for a customer to know if the merchant web site is really authorized to accept credit cards or if it is just a fake site designed to collect credit card numbers. These protocols encrypt the data being transmitted, so that when a credit card number is submitted through their WWW form, it travels to the server encrypted. This method does help ease people's fear, but it still does not go far enough for many people to feel comfortable using their credit card online. It becomes apparent that for online commerce to flourish, a truly secure means of making payment needs to be developed.

Another protocol developed jointly by MasterCard and Visa uses a technology called SET (secure electronic transaction). It is a protocol that uses electronic certificates to identify the various parties. These certificates are used to encrypt the information, to authenticate the identities of the parties and to place digital signatures on the information. The SET protocol is a more powerful protocol than the SSL protocol. The certificates are actually a digital copy of the original credit card, i.e. a virtual credit card. Because the protocol uses unique certificates for the various parties, all of the parties involved can be absolutely certain that they are doing business with properly authorized parties. The purchaser's software generates and individually encrypts two information packages. One of the packages contains the order information and is destined for the on-line shop. Only the on-line shop can read this package. The other package contains the payment information (credit card number, expiration date and amount). The transaction is authorized or rejected based on this package, which only the credit card company can read. The major disadvantage of this system is that it is still not fraud free as the credit cards used for the online transaction could be stolen or cloned credit cards. These stolen or cloned credit cards could be used for illegal transactions over the Internet without the customer's knowledge.

Bank merchant accounts provide credit card processing for the majority of web sites today. These are business accounts (usually) set up through regular banks. An example of a typical transaction which takes place when using a merchant account is as described below:
  (a) The customer initiates a purchase from a web site, usually by "checking out" with a shopping cart.
  (b) The bank that supplies the merchant account "authorizes" the purchaser's credit card, checking for fraud and verifying that the card has enough available credit to pay for the purchase. This process usually takes just a few seconds.
  (c) After the purchase is authorized by the bank, the merchant ships the merchandise to the customer or supplies him with a download link in the case of a downloadable digital product (such as an e-Book or software package).
  (d) After a few days the bank transfers the funds (less transaction fees) for the purchase into the merchant's bank account.

Attaining merchant status can be hard for small businesses, especially if they are home-based or sell by mail order. Banks are afraid of extending merchant status to businesses that present too much risk, and home-based and mail order business are perceived as high risk. Banks are afraid that an "at risk" business will not be able to handle any charge-back that hit their account. If the merchant cannot handle a charge-back, the bank that processed the credit card will have to absorb the loss. In fact, VISA will penalize a bank if they have a merchant account that has more than 1 percent charge-back of their sales.

Performing a search on the web for "credit card" or "merchant status" will lead to a number of pages claiming that they can obtain merchant status for your business. Small businesses must be cautious because there are many con-artists out there who offer to help a business gain merchant status and then walk away with the processing fee never to be heard from again. If you look at the credit card processing companies that advertise online, you will see that discount rates, transaction fees, and equipment sale/lease prices can vary widely. Thus, the start-up and recurring costs involved can be quite substantial to the merchant who needs a system to ensure payment of their goods purchased over the Internet.

Disadvantages of Merchant accounts include:
  (a) Can be difficult to qualify for. They have stringent personal and/or business credit requirements. They also tend to be picky about the types of businesses that they accept.
  (b) It takes a while to get an account approved and set up. This can easily take anywhere from a couple of weeks to a month or more.
  (c) There is usually a relatively high application fee and/or set up fee.

Online payment services are a viable option for smaller web-based businesses and for online auction sellers. Opening an account is fast and easy, but there are a few negatives. The typical sales process when using an online payment service is:
  (a) The customer clicks on a sales link or "checks out" with the shopping cart. The payment service authorizes the credit card or deducts the proper amount from the customer's online payment account if there are enough available funds in the account.
  (b) The online payment service credits the transaction amount (less any applicable transaction fees) into the seller's online account.
  (c) Both the customer and the seller receive emails from the payment service verifying the transaction.
  (d) The seller ships the merchandise or provides a download link (if applicable) to the customer.
  (e) The seller requests a transfer of funds from his online account into his bank account. This can take anywhere from a few days to a couple of weeks, depending on the particular service used. Some services will send the seller a check instead of initiating a bank transfer.

Disadvantages of using online payment services include:
  (a) They are still relatively unknown to consumers when compared to traditional merchant accounts which tend to lower the number of sales that will be made.
  (b) The transaction fees charged by online payment services are typically much higher than those available from regular merchant accounts.
  (c) Getting the money transferred from the online payment service into the bank account usually takes longer than with a merchant account. If a paper check must be accepted it takes even longer.
  (d) Before a potential customer can purchase an item, he or she usually must first open an account with the online payment service. This is an extra (and intrusive) step that will keep some customers from buying.

SUMMARY OF THE INVENTION

Accordingly, in order to overcome these difficulties, several objects and advantages of the invention are:
  (a) to encourage e-commerce by providing an online secure and fraud-free payment method for internet purchases without using credit cards; whereby the use of the credit card data currently susceptible to cyber thefts or fraudulent use by unscrupulous web merchants is avoided.
  (b) to accelerate e-commerce by enabling a large market segment of new customers (who do not own credit cards) to make purchases over the internet, as a system in accordance with the invention does not use credit cards to make payment for e-commerce.
  (c) to enable customers to purchase MyBankPay codes for any specific dollar amount to be used by customers for internet purchases and to make payment. This ensures that customers can choose any specific dollar amount of money to be used in their internet transaction. It allows the customer to avoid tying up their cash flow as in the current case of pre-paid cards used in online internet purchases.
  (d) to enable customers to purchase MyBankPay codes for any specific dollar amount via online internet purchase by logging into their bank's website and purchasing the MyBankPay codes (using their bank accounts e.g. savings account, current account, credit and debit card) and then to make purchases over the internet using the purchased MyBankPay codes.

(e) to enable customers to use phone banking (using mobile or fixed telephone lines) to purchase MyBankPay codes for any specific dollar amount and then to make purchases over the internet using the purchased MyBankPay codes. The customers can use phone banking to purchase any specific dollar amount of MyBankPay codes to make purchases over the internet while they are either domicile in their respective country or when they are traveling overseas. The customers can also use their mobile phones to surf the Internet and make online transactions using the purchased MyBankPay codes.

(f) to enable customers to use their respective bank's Automatic Teller Machines (ATM) to purchase MyBankPay codes for any specific dollar amount and then to use the purchased MyBankPay codes to make purchases over the internet.

(g) to enable the MyBankPay codes to have a validity period of X days (e.g. 30 days, 45 days, 60 days, etc.).

(h) to enable customers to use the purchased MyBankPay code more than one time to make payment for their online purchases (until the expiry date of the MyBankPay code).

(i) to enable customers to re-load their MyBankPay codes for any dollar amount when the dollar value of their MyBankPay code has been used up.

(j) to enable customers to use a combination of MyBankPay codes to pay for their online purchases (if their MyBankPay code at hand has insufficient dollar amounts).

(k) to enable any remaining/excess amount of MyBankPay codes not utilized by customers for online payment to be automatically and/or manually credited back to the customer's bank account by the customer's bank when the validity date of the MyBankPay codes have expired.

(l) to enable the merchant's computer/website to redirect the payment process by the customer to the secure MyBankPay payment gateway system.

(m) to enable customers to key in their secret password and MyBankPay codes to make payment for their online purchases at MyBankPay's secure payment gateway system.

(n) to enable customers to choose the MyBankPay code currency from a drop-down list; if the local currency of the customer is different from the transacted currency.

(o) to enable customers to view and agree with the foreign exchange rate; if the local currency of the customer is different from the transacted currency.

(p) to enable customer's bank to check and validate the customer's secret password and MyBankPay codes and to approve the customer's transaction by authorizing MyBankPay to make payment to the merchant for the goods purchased by customer at the merchant's web store.

(q) to enable customers to know on a Real Time basis whether their transaction payment request have been validated and authorized by their bank at MyBankPay's secure payment gateway system.

(r) to enable the customer's financial data to be protected since no financial data of the customer is revealed during the online internet transaction.

(s) to enable the customer's privacy to be protected since no personal details of the customer is revealed during the online internet transaction.

(t) to avoid the need for the customer to first open an account with MyBankPay payment service. This eliminates the extra (and intrusive) step faced by customers who are currently using online payment services.

(u) to enable website merchants to receive payments for goods purchased from their websites without having to open merchant accounts with banks which tend to have stringent business credit requirements in granting merchant accounts to smaller merchants who are perceived to be at a high risk business.

(v) to enable the website merchants to conduct e-commerce immediately (once their website is ready) by providing them with a secure online payment gateway whereby approval and set-up is fast instead of the current slow approval and set-up time frame (which can vary from a couple of weeks to a month or more).

(w) to eliminate the operational cost of setting up a merchant account (e.g. set-up fee and equipment sale/lease fees, etc.) as none is applicable in a system in accordance with the invention.

(x) to enable website merchants to eliminate chargeback (which can be substantial) and eliminate being penalized by banks for having chargeback on their sales.

(y) to enable website merchants to receive money from the Internet transaction whereby the amount of money due from the Internet transaction will be credited directly into the web merchant's bank account when the transaction has been approved by the customer's bank.

Further objects and advantages of the invention include its simplicity to use, fast transaction speed in a secure payment gateway and free of charge to all customers. All these objects and advantages will assist the general acceptance and acceleration of conducting fraud free e-commerce for both the customers and the website merchants. Other objects and advantages will become apparent from a consideration of the ensuing description and drawings In accordance with the present invention, a fraud free payment method for customers to make Internet purchases (without using credit cards) is provided to accelerate the growth of e-commerce. Customers can purchase any specific dollar amount of MyBankPay (the name used herein to describe the codes generated by the system and the system itself) codes via online Internet purchase by logging into their bank's website and purchasing the MyBankPay codes (using their bank account), via phone banking (using mobile phone or fixed telephone line) or via Automated Teller Machine (ATM) to be used for e-commerce.

Easy and fast set-up of a secure payment gateway for website merchants to receive payments for their goods purchased at their websites, eliminates the need of setting up a merchant account (which is both time consuming and expensive), and eliminates chargeback and being penalized by banks for chargeback on their sales.

There is no need for the customer to first open an account with MyBankPay online payment service. This effectively eliminates the extra (and intrusive) step faced by the customer in other current online payment service providers.

Thus, the invention is directed to a fraud-free method of payment for Internet purchase comprising purchasing of pay codes by customers for any specific payment amount by logging into a system of a customer's bank or other financial institution; and paying for online Internet purchases using the purchased pay codes. The pay codes may be purchased by the customer by logging on to a website of the bank or financial institution. No credit cards or personal information of a customer need be used. A customer may purchase the codes from a bank or a financial institution at which the customer has an account, using funds in that account. The account may be a savings account, current account, credit card account or debit card account. The system also may be accessed by the customer using mobile or fixed telephone lines. Thus, customers may make purchases over the Internet while domicile in their respective country or when they are traveling to other countries. The customers may use their mobile phones to surf the Internet and make online transactions. Customers can also use their respective bank's Automatic Teller Machines (ATM) to purchase pay codes. The pay codes may have a validity period of a predetermined number of days.

The invention is also directed to a fraud-free method of payment for Internet purchase comprising: purchasing of pay codes by customers for a specific payment amount by depositing cash in a cash deposit machine and purchasing codes using the cash deposited in the cash deposit machine, or purchasing of pay codes at a convenience store; and paying for online Internet purchases using the purchased pay codes.

In accordance with another aspect of the invention, in a system for conducting secure e-commerce including a customer computer, a merchant computer or website, a customer's bank's computer or website and a pay code payment gateway system, which are connected to each other by one or more communication channels for sending transaction instruction and receiving a payment authorization instruction for a transaction, the invention is directed to a method comprising: establishing communication between a customer's computer and a merchant computer or website via one or more communication channels; receiving products and services data from the merchant's computer or web site at the customer's computer, selecting products or services to purchase by the customer and sending transaction data to the merchant's computer/website for processing; processing the customer's transaction data at the merchant's computer or website and sending the customer's transaction data and merchant data to the pay code payment gateway system for authorization of payment; processing the customer and merchant transaction data at the pay code payment gateway system and the pay code payment gateway system requesting that the customer enter a secret password and a pay code at the pay code payment gateway system; entering of the secret password and the pay code in the secure payment gateway system by the customer; sending of the secret password and the pay code by the pay code payment gateway system to the customer's bank to seek verification and authorization for payment; checking and verifying the secret password and the pay code and sending status of whether the transaction is approved or not approved by the customer's bank computer system; sending of transaction status to the customer by the pay code payment gateway system; and sending from the pay code payment gateway system, payment approval to the merchant so that the merchant may ship goods or services to the customer.

In accordance with the invention customers can use the pay codes until a predetermined expiry date. Customers may re-load pay codes with any amount when the value of the pay code has been exhausted. A combination of pay codes may be used to pay for a purchase. Any remaining value of pay codes not utilized by customers for online payment after an expiry date of the pay codes is reached may be credited back to the customer's account by the customer's bank or financial institution. Advantageously, the merchant computer or website may be configured to redirect the payment process by the customer to the pay code payment gateway system. Encryption and decryption algorithms and technology may be used to encrypt and decrypt transaction data and payment instructions. A certification authority may be used to authenticate transaction data and payment.

Also, in accordance with the invention, if the local currency of the customer is different from the transacted currency, the customer may choose a currency for the pay code. The pay code payment gateway system may display the foreign exchange rate to the customer for acceptance by the customer.

Preferably, the sending of transaction status to the customer by the pay code payment gateway system customers is done in real time so that the customer know immediately if the transaction has been validated and approved. Also, preferably the customer does not require an account with a payment service provider and website merchants receive payment for goods purchased from their websites without having to open merchant accounts with banks. Website merchants can conduct e-commerce immediately, when the merchant computer or website is made ready. The merchants have no chargeback on sales and thus no penalty by banks for having chargebacks. An amount of money due from the transaction may be credited directly into the web merchant bank account, when the transaction has been approved by the customer bank.

The method may further comprise performing account reconciliation and payment among the merchant, the pay code payment gateway system and the customer bank on a regular basis. The customer's bank may check and validate the customer's secret password and pay codes and approves the customer's transaction. One or more authentication mechanisms may be used to authenticate the identities and payment requests of the customer's bank and the merchant. The cost of setting up a merchant account is avoided.

The invention is also directed to a computer system for implementing any of the methods mentioned above and/or described below. Further, the invention is also directed to one or more computer readable media having computer code stored thereon for causing a computer system to perform any of the methods, or portions of the methods, mentioned above and/or described below. The computer readable medium also may comprise different media, located in the different facilities described herein, which together perform the methods, or a single medium form performing the method or selected steps thereof.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
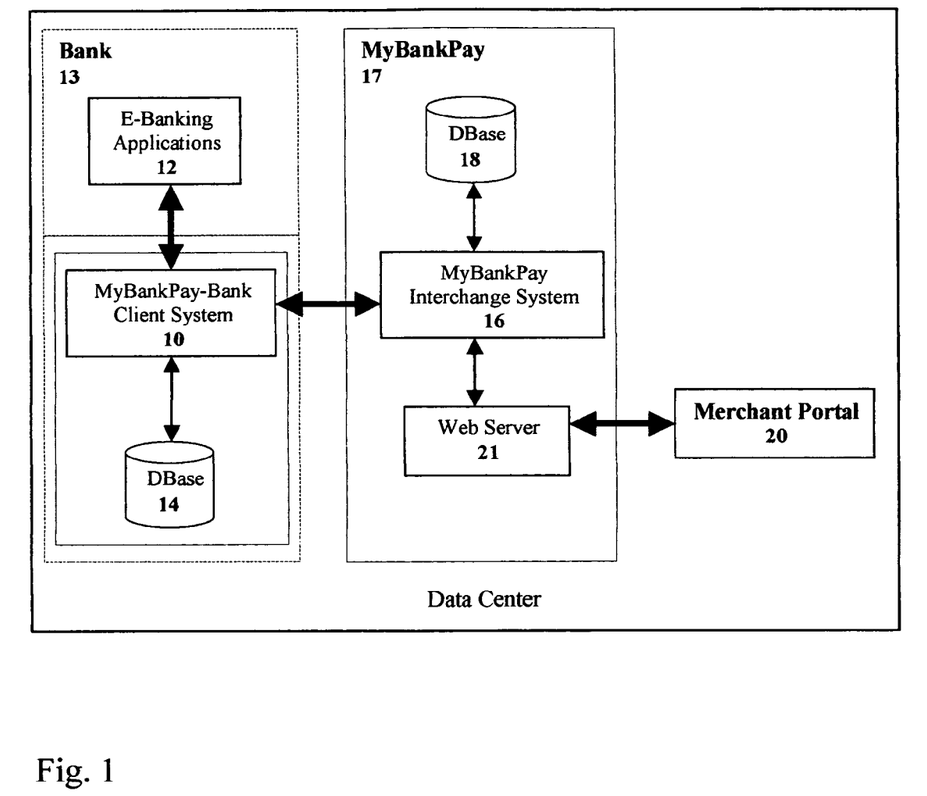
FIG. 1 is an overview of the MyBankPay payment gateway system set-up in accordance with the invention, including three major component systems i.e. (a) MyBankPay-Bank Client System, (b) MyBankPay Interchange System and (c) Merchant Portal.

FIG. 1 shows the overview of MyBankPay payment gateway system and it is made up of three major components, as follows:

(a) The MyBankPay-Bank Client System 10, communicates with both the e-Banking application 12 of the customer's bank 13, and the MyBankPay Interchange System 16. A database 14, within the MyBankPay-Bank Client System 10, stores the information on the MyBankPay codes purchased by the bank's customers.

(b) The MyBankPay Interchange System 16 runs in MyBankPay's data center 17 and includes a database 18. This is the heart of the MyBankPay payment gateway system and communicates with both the MyBankPay-Bank Client System 10, and a Merchant Portal 20, by means of a Web Server 21.

(c) The Merchant Portal 20, is the merchant website and it communicates with the MyBankPay Interchange System at 16, by means of a Web Server 21, using a set of commands provided by MyBankPay.

Figure 2:
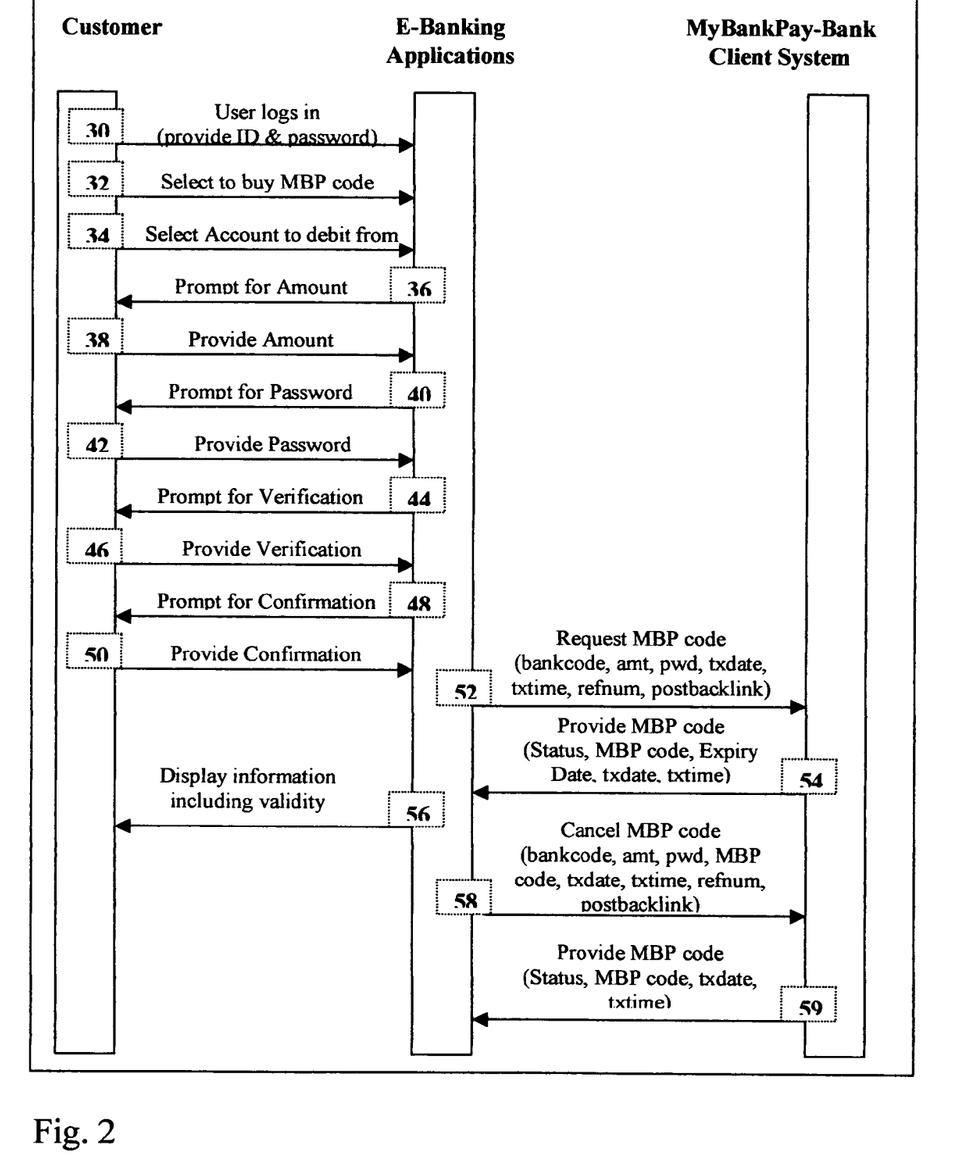
FIG. 2 shows the data flow and interface between the customer, the customer's bank's e-banking application and MyBankPay-Bank Client System, in accordance with the invention.

FIG. 2 shows the data flow and interface between the customer, the customer's bank's e-banking application (FIG. 1, at 12) and MyBankPay-Bank Client System (FIG. 1, at 10). When the customer logs into his bank's website to conduct online banking, he will be prompted by his bank to sign-in by entering his User ID and password, at 30. Upon successful log-in, the main menu of the e-banking application of the bank will be displayed to the customer. At 32, the customer selects from his bank's e-banking application to purchase MyBankPay codes. At 34, the customer selects the bank account (e.g. savings account, current account, credit or debit card, etc.) that he wishes to debit from. At 36, customer's bank prompts customer to enter amount of MyBankPay code required. At 38, customer enters the amount of MyBankPay code required. At 40, customer's bank prompts customer to enter his secret password. At 42, the customer enters his secret password (the password entered by the customer will be masked). At 44, customer's bank prompts the customer to reconfirm his secret password. At 46, the customer reconfirms his secret password (the reconfirmation of password entered by the customer will be masked). At 48, the customer's bank prompts the customer to confirm the purchase of MyBankPay code. At 50, the customer provides confirmation to his bank of his purchase of MyBankPay code. At 52, the customer's bank communicates with the MyBankPay-Bank Client System (FIG. 1 at 10) and requests the issuance of a MyBankPay code by passing across the relevant data (data to include bank code, amount, password, transaction date, transaction time, reference number, post-back link).

At 54, the MyBankPay-Bank Client System (FIG. 1 at 10) generates a MyBankPay code using a random engine and calculates the expiry date. Preferably, the MyBankPay code is made up of a 6-digit bank code (which is made up of the country code and bank ID) and a 13-digit random number. The MyBankPay-Bank Client System (FIG. 1 at 10) then passes across to the customer's bank the relevant information (data to include status, MyBankPay code, expiry date, transaction date, transaction time). Upon receiving the MyBankPay code from the MyBankPay-Bank Client System (FIG. 1 at 10), the customer's bank (FIG. 1 at 13), at 56, will display the information to the customer (data to include MyBankPay code, amount, expiry date, transaction date, transaction time and reference number) and debit the customer's bank account for the amount of MyBankPay code that the customer has purchased.

In the event that the customer's bank triggers a Cancel MyBankPay Code Command (e.g. expiration date of the MyBankPay code), at 58, the customer's bank 13 will pass across to the MyBankPay-Bank Client System 10 the relevant information (data to include bank code, MyBankPay code, amount, password, transaction date, transaction time, reference number, post-back link). At 59, the MyBankPay-Bank Client System 10 will pass back to the customer's bank 13 the relevant information (data to include status, MyBankPay code, transaction date, transaction time) and the status of the MyBankPay code will be set to "Cancelled". Apart from purchasing the required MyBankPay codes from their bank via online Internet purchase (wherein the customer logs into his bank's website and purchases the MyBankPay codes using his bank account; as described above), the customer can also purchase MyBankPay codes using either phone banking (mobile or fixed telephone lines) or using the bank's Automatic Teller Machines (ATM).

Figure 3:
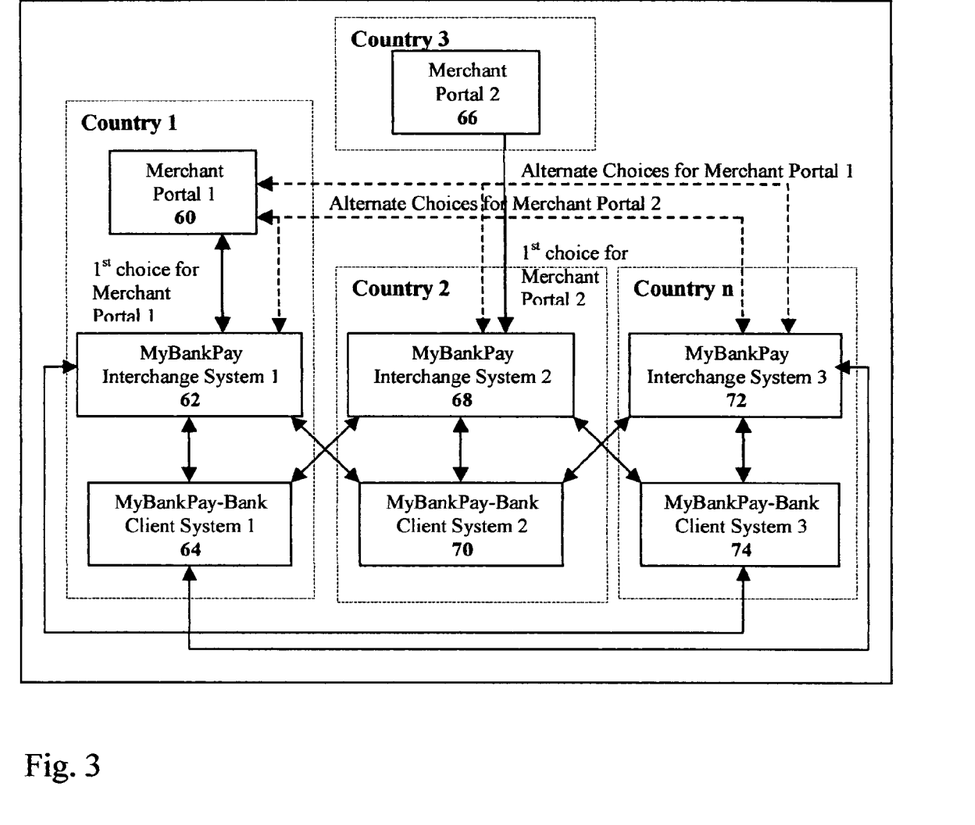
FIG. 3 shows the overview of the infrastructure of the MyBankPay Interchange System, in accordance with the invention.

FIG. 3 shows an overview of a preferred embodiment of the infrastructure of a MyBankPay Interchange System. Components of the MyBankPay Interchange System are placed at strategic locations around the world so as to speed up Internet transactions within a specific country and to minimize transborder transactions. One of the MyBankPay Interchange Systems is identified as the primary system where maintenance and administration is performed. Merchant Portals at 60, 66 are provided with the required scripting to interface with the appropriate MyBankPay Interchange System at 62, 68, 72. In FIG. 3, Merchant Portal 1, at 60, will be set to interface with MyBankPay Interchange System 1, at 62, as the first choice. If MyBankPay Interchange System 1, at 62, is not available, the scripts provided to the Merchant Portal 1, at 60, will seek out the next available MyBankPay Interchange System e.g. MyBankPay Interchange System 2, at 68 or MyBankPay Interchange System 3, at 72, or others. Likewise, Merchant Portal 2, at 66, will be set-up to interface with MyBankPay Interchange System 2, at 68, as the first choice. If MyBankPay Interchange System 2, at 68, is not available, the scripts provided to the Merchant Portal 2, at 66, will seek out the next available MyBankPay Interchange System e.g. MyBankPay Interchange System 1, at 62 or MyBankPay Interchange System 3, at 72, or others. This configuration allows one MyBankPay Interchange System to act as the backup for the others. Based on the MyBankPay code entered by the customer, the MyBankPay Interchange System interfaces with the appropriate MyBankPay-Bank Client System, at 64, 70 or 74. All transactional data is stored in the MyBankPay Interchange System. A database management system, of a type well known in the art, allows the data to be synchronized to a central database, preferably in the MyBankPay Interchange System identified as the primary system.

Figure 4:
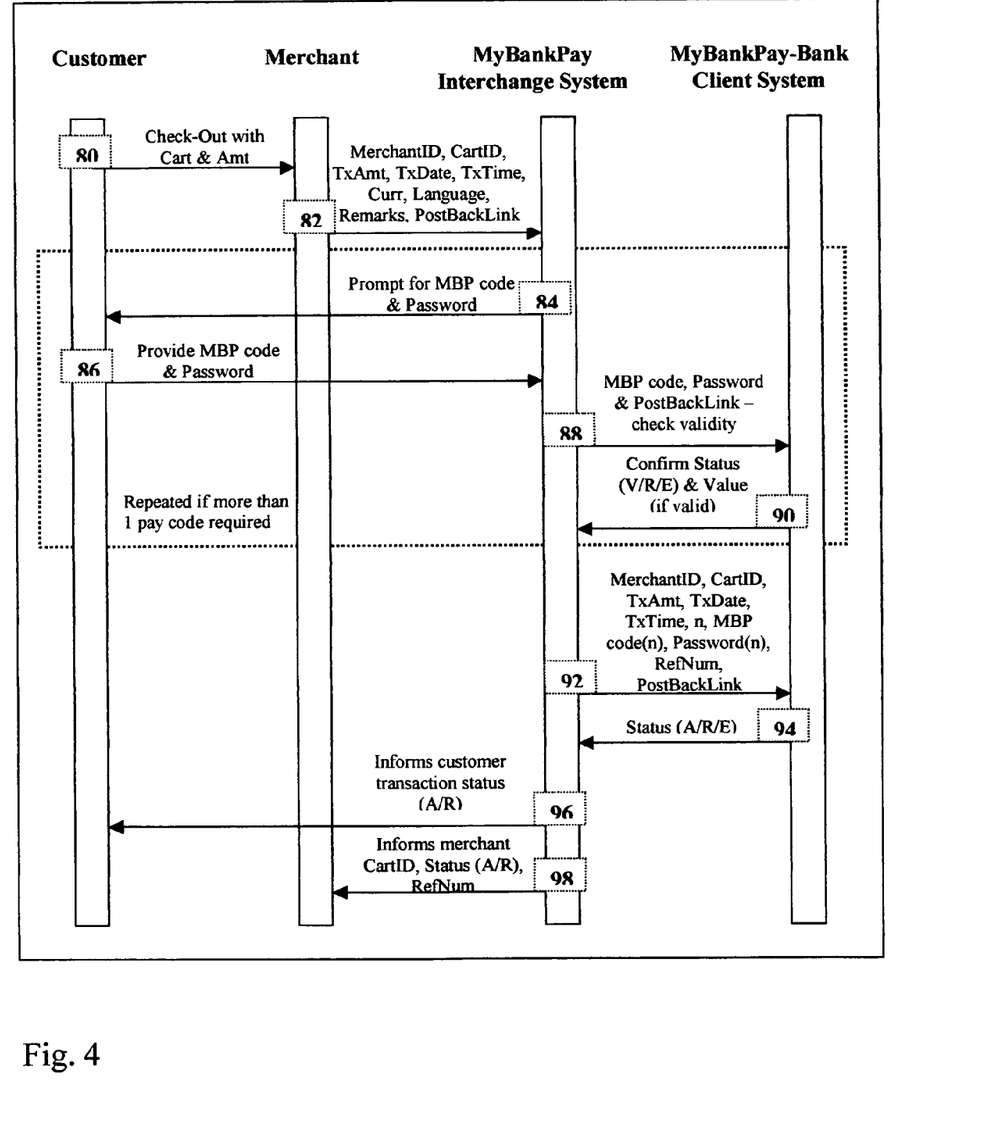
FIG. 4 shows the data flow and interfaces between the MyBankPay Interchange System and the merchant/customer and the MyBankPay-Bank Client System, in accordance with the invention.

FIG. 4 shows the data flow and interfaces between the MyBankPay Interchange System and the merchant/customer and the MyBankPay-Bank Client System. All communication is secured through Secure Socket Layer (SSL) or any other technologies that may become available in the future. At 80, the customer confirms his purchase and Check-Out with the Shopping Cart at the merchant's online store and clicks the MyBankPay payment icon to make payment. The merchant, at 82, passes across to the MyBankPay Interchange System the relevant transaction data which includes merchant ID, cart ID, transaction amount, transaction date, transaction time, transaction currency, language, remarks and post-back link.

Communication between the MyBankPay Interchange System and the customer commences, at 84, after the Merchant sends across the transaction data to the MyBankPay Interchange System. The MyBankPay Interchange System displays to the customer the merchant name, cart ID and the transaction amount in the transacted currency. The customer can choose the MyBankPay code currency from a drop-down list; if the local currency of the customer is different from the transacted currency. The MyBankPay Interchange System displays the foreign exchange rate to the customer for his acceptance. At 84, the MyBankPay Interchange System prompts the customer to enter his MyBankPay code and secret password. The customer, at 86, enters his MyBankPay code and password in the MyBankPay's secure platform (wherein the password entered by the customer is masked). The MyBankPay Interchange System performs an initial check of the MyBankPay code entered by the customer and then communicates with the MyBankPay-Bank Client System and pass across the customer's MyBankPay code, password and post-back link to check the validity of the customer's MyBankPay code and password, at 88. The MyBankPay-Bank Client System, at 90, returns the Validity status to the customer at the MyBankPay Interchange System. If either the customer's MyBankPay code is not valid or has expired; or his password is incorrect, the MyBankPay Interchange System displays to the customer an error message "Invalid MyBankPay Code or Password". If both the customer's MyBankPay code and Password are valid, the value of the MyBankPay code will be displayed.

If the value of the customer's MyBankPay code is insufficient to pay for the online transaction, a message is displayed to the customer to ask him to enter a new MyBankPay code (s), and steps 84 to 90 are repeated until the value of the MyBankPay code is equal to or exceeds the transaction amount. The collective MyBankPay codes' values will be displayed to the customer, and to proceed with the payment to the merchant, the customer simply clicks or activates the "Confirm" button. The customer may cancel the transaction at anytime by clicking the "Cancel" button. When the transaction is confirmed by the customer, the MyBankPay Interchange System, at 92, will post the transaction data (merchant ID, cart ID, transaction amount, transaction date, transaction time, number of MyBankPay codes, all the MyBankPay codes, their corresponding passwords, transaction reference number and post-back link) to the MyBankPay-Bank Client System to be recorded. At 94, the MyBankPay-Bank Client System will update its database (e.g. update the amount balance and amount last used) and pass across the updated status to the MyBankPay Interchange System. At 96, the MyBankPay Interchange System displays a message to the customer on the status of the transaction (Approved or Rejected). Simultaneously, at 98, the MyBankPay Interchange System informs the merchant about the status of the transaction and passes across transaction data which includes cart ID, status (Approved or Rejected) and transaction reference number. If status is approved, the merchant can proceed to ship the goods to the customer and the merchant will be paid based on the transaction reference number given.

Thus, since the customer uses MyBankPay codes to pay for internet purchases (which can be purchased for any specific dollar amount and whereby additional new MyBankPay codes can be purchased by the customer with his bank either on-line, via phone banking or using automated teller machines), the use of credit cards which are prone to cyber thefts of credit card data and by fraudulent use of credit card data by unscrupulous website merchants, is entirely avoided. No other personal or bank data of the customer is required or divulged during the customer's online shopping transaction using MyBankPay codes. The MyBankPay codes are only known to the customer and his/her bank and the validation and confirmation of the MyBankPay codes are done in a secure network.

It will be understood that the communication channels of FIG. 4 may also be used for reconciliation account reconciliation and payment among the merchant, the pay code payment gateway system and the customer bank on a regular basis. Further, while the identity of the customer is established with a secret password and pay code, various authentication mechanism such as passwords pay codes, and digital certificates also may be used to authenticate the identities and payment request of the customer's bank and the merchant.

From the description above, a number of advantages of the invention become evident, and all of the objects of the invention set forth above are achieved:

(a) to encourage e-commerce by providing an online secure and fraud-free payment method for internet purchases without using credit cards; whereby the credit card data are currently susceptible to cyber thefts or fraudulent use by unscrupulous web merchants.

(b) to accelerate e-commerce by enabling a large market segment of new customers (who do not own credit cards) to make purchases over the internet as our system does not use credit cards to make payment for e-commerce.

(c) to enable customers to purchase MyBankPay codes for any specific dollar amount to be used by customers for internet purchases and to make payment. This ensures that customers can choose any specific dollar amount of money to be used in their internet transaction. It allows the customer not to tie-down their cash flow as in the current case of pre-paid cards used in online internet purchases.

(d) to enable customers to purchase MyBankPay codes for any specific dollar amount via online internet purchase by logging into their bank's website and purchasing the MyBankPay codes (using their bank account e.g. savings account, current account, credit and debit card) and then to make purchases over the internet using the purchased MyBankPay codes.

(e) to enable customers to use phone banking (using mobile or fixed telephone lines) to purchase MyBankPay codes for any specific dollar amount and then to make purchases over the internet using the purchased MyBankPay codes. The customers can use phone banking to purchase any specific dollar amount of MyBankPay codes to make purchases over the internet while they are either domicile in their respective country or when they are traveling overseas. The customers can also use their mobile phones to surf the internet and make online transactions using the purchased MyBankPay codes.

(f) to enable customers to use their respective bank's Automatic Teller Machines (ATM) to purchase MyBankPay codes for any specific dollar amount and then to use the purchased MyBankPay codes to make purchases over the internet.

(g) to enable the MyBankPay codes to have a validity period of X days (e.g. 30 days, 45 days, 60 days, etc.)

(h) to enable customers to use the purchased MyBankPay code more than one time to make payment for their online purchases (until the expiry date of the MyBankPay code).

(i) to enable customers to re-load their MyBankPay codes for any dollar amount when the dollar value of their MyBankPay code has been used up.

(j) to enable customers to use a combination of MyBankPay codes to pay for their online purchases (if their MyBankPay code at hand has insufficient dollar amounts).

(k) to enable any remaining/excess amount of MyBankPay codes not utilized by customers for online payment to be automatically and/or manually credited back to the customer's bank account by the customer's bank when the validity date of the MyBankPay codes have expired.

(l) to enable the merchant's computer/website to redirect the payment process by the customer to the secure MyBankPay payment gateway system.

(m) to enable customers to key in their secret password and MyBankPay codes to make payment for their online purchases at MyBankPay's secure payment gateway system.

(n) to enable customers to choose the MyBankPay code currency from a drop-down list; if the local currency of the customer is different from the transacted currency.

(o) to enable customers to view and agree with the foreign exchange rate; if the local currency of the customer is different from the transacted currency.

(p) to enable customer's bank to check and validate the customer's secret password and MyBankPay codes and to approve the customer's transaction by authorizing MyBankPay to make payment to the merchant for the goods purchased by customer at the merchant's web store.

(q) to enable customers to know on a Real Time basis whether their transaction payment request have been validated and authorized by their bank at MyBankPay's secure payment gateway system.

(r) to enable the customer's financial data to be protected since no financial data of the customer is revealed during the online internet transaction.

(s) to enable the customer's privacy to be protected since no personal details of the customer is revealed during the online internet transaction.

(t) there is no need for the customer to first open an account with MyBankPay payment service. This will eliminate the extra (and intrusive) step faced by customers who are currently using online payment services.

(u) to enable website merchants to receive payments for goods purchased from their websites without having to open merchant accounts with banks which tend to have stringent business credit requirements in granting merchant accounts to smaller merchants who are perceived to be at a high risk business.

(v) to enable the website merchants to conduct e-commerce immediately (once their website is ready) by providing them with a secure online payment gateway whereby approval and set-up is fast instead of the current slow approval and set-up time frame (which can vary from a couple of weeks to a month or more).

(w) to eliminate the operational cost of setting up a merchant account (e.g. set-up fee and equipment sale/lease fees, etc.) as none is applicable in our system.

(x) to enable website merchants to eliminate chargeback (which can be substantial) and eliminate being penalized by banks for having chargeback on their sales.

(y) to enable website merchants to receive money from the Internet transaction whereby the amount of money due from the Internet transaction will be credited directly into the web merchant's bank account when the transaction has been approved by the customer's bank

CONCLUSION, RAMIFICATION, AND SCOPE

Accordingly it will be realized that, in accordance with the present invention, a fraud free payment method; using MyBankPay codes, enhances the customers confidence in making online transactions over the Internet. Customers can purchase any specific dollar amount of MyBankPay codes via on-line Internet purchase (using customer's bank account), phone banking (using mobile phone or fixed telephone line) or Automated Teller Machine (ATM) for e-commerce. The use of MyBankPay codes for online internet transactions eliminates the risk of cyber thefts of credit card data and fraudulent use of credit card data by unscrupulous website merchants.

While the above description contains many specificities, these should not be construed as limitations on the scope of the invention, but as exemplifications of the presently preferred embodiments thereof. Many other ramifications and variations are possible within the teachings of the invention. For example, the MyBankPay codes can be purchased not only from the customer's bank for it can also be purchased by customers from other establishments such as telecommunication companies, certified retail outlets, other automated payment machines, post offices, petrol stations, etc. Cash Deposit Machines (CDM's) can be used to facilitate the purchase of MyBankPay codes by depositing cash, and without the need to have an account in a bank. Other places and means for the purchase of MyBankPay codes may include convenience stores, SMS used on telephones, and any other technology now known or that may become available in the future.

Variations described for the present invention can be realized in any combination desirable for each particular application. Thus particular limitations, and/or embodiment enhancements described herein, which may have particular advantages to the particular application need not be used for all applications. Also, it should be realized that not all limitations need be implemented in methods, systems and/or apparatus including one or more concepts of the present invention.

The present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. In a system for conducting secure e-commerce including a customer computer, a merchant computer or merchant website, a customer's bank's computer or a customer's bank's website, and a pay code payment gateway system, which are connected to each other by one or more communication channels for sending transaction instruction and receiving a payment authorization instruction for a transaction, the method comprising:
buying via on-line banking, telephone banking or automated teller machine from a client system that interacts with the pay code payment gateway system, a pay code having a customer selected payment value, and wherein the pay code is used by the customer for making purchases over the internet and wherein the pay code is reloadable;
establishing communication between a customer's computer and a merchant computer or merchant website via one or more communication channels;
receiving products and services data from the merchant's computer or web site at the customer's computer;
selecting products or services to purchase by the customer and sending transaction data to the merchant's computer or merchant website for processing;
processing the customer's transaction data at the merchant's computer or website and sending the customer's transaction data and merchant data to the pay code payment gateway system for authorization of payment;
processing the customer and merchant transaction data at the pay code payment gateway system and the pay code payment gateway system requesting that the customer enter a secret password and a pay code at the pay code payment gateway system;
entering of the secret password and the pay code in the secure payment gateway system by the customer;
sending of the secret password and the pay code by the pay code payment gateway system to the customer's bank to seek verification and authorization for payment;
checking and verifying the secret password and the pay code by the customer's bank and sending status of whether the transaction is approved or not approved by the customer's bank computer system;
wherein the sending of transaction status is sent to the customer by the pay code payment gateway system; and
sending from the pay code payment gateway system, payment approval to the merchant and the merchant ships the goods or services to the customer in response to the approval.

2. The method of claim 1, wherein customers can use the pay codes until a predetermined expiry date.

3. The method of claim 1, further comprising customers re-loading pay codes with a desired amount when the value of the pay code has been exhausted.

4. The method of claim 1, wherein customers use a combination of pay codes to pay for a purchase.

5. The method of claim 1, further comprising crediting back to the customer's bank account by the customer's bank any remaining value of pay codes not utilized by customers for online payment after an expiry date of the pay codes is reached.

6. The method of claim 1, wherein the merchant computer or website redirects the payment process by the customer to the pay code payment gateway system.

7. The method of claim 1, further comprising the customer choosing a currency for the pay code; if the local currency of the customer is different from the transacted currency.

8. The method of claim 7, further comprising wherein the pay code payment gateway system displaying the foreign exchange rate to the customer for acceptance by the customer.

9. The method of claim 1, further comprising using encryption and decryption algorithm to encrypt and decrypt transaction data and payment instructions.

10. The method of claim 1, further comprising using a certification authority to authenticate transaction data and payment.

11. The method of claim 1, wherein the sending of transaction status to the customer by the pay code payment gateway system customers is done in real time so that the customer know immediately if the transaction has been validated and approved.

12. The method of claim 1, wherein no financial data and no personal information of the customer is revealed during the online Internet transaction.

13. The method of claim 1, wherein the customer does not require an account with a payment service provider and wherein website merchants receive payment for goods purchased from their websites without having to open merchant accounts with banks.

14. The method of claim 1, wherein website merchants can conduct e-commerce immediately, when the merchant computer or website is made ready.

15. The method of claim 1, wherein website merchants have no chargeback on sales and no penalty by banks for having chargebacks.

16. The method of claim 1, further comprising crediting an amount of money due from the transaction directly into the web merchant bank account, when the transaction has been approved by the customer bank.

17. The method of claim 1, further comprising performing account reconciliation and payment among the merchant, the pay code payment gateway system and the customer bank on a regular basis.

18. The method of claim 1, wherein customer's bank checks and validates the customer's secret password and pay codes and approves the customer's transaction.

19. The method of claim 1, further comprising using one or more authentication mechanisms to authenticate the identities and payment requests of the customer's bank and the merchant.

20. The method of claim 1, wherein the operational cost of setting up a merchant account is avoided.

21. A computer system for implementing the method of claim 1.

22. A non-transitory computer readable medium having computer code stored thereon for causing a computer system to perform the method of claim 1.

23. The method of claim 1, wherein the pay codes include a portion representative of an issuing bank and a portion that is a random number.

24. The method of claim 1, wherein the client system is bank client system.

25. The method of claim 1, wherein all transactional data is stored in the pay code payment gateway system.

* * * * *